Patented Feb. 27, 1923.

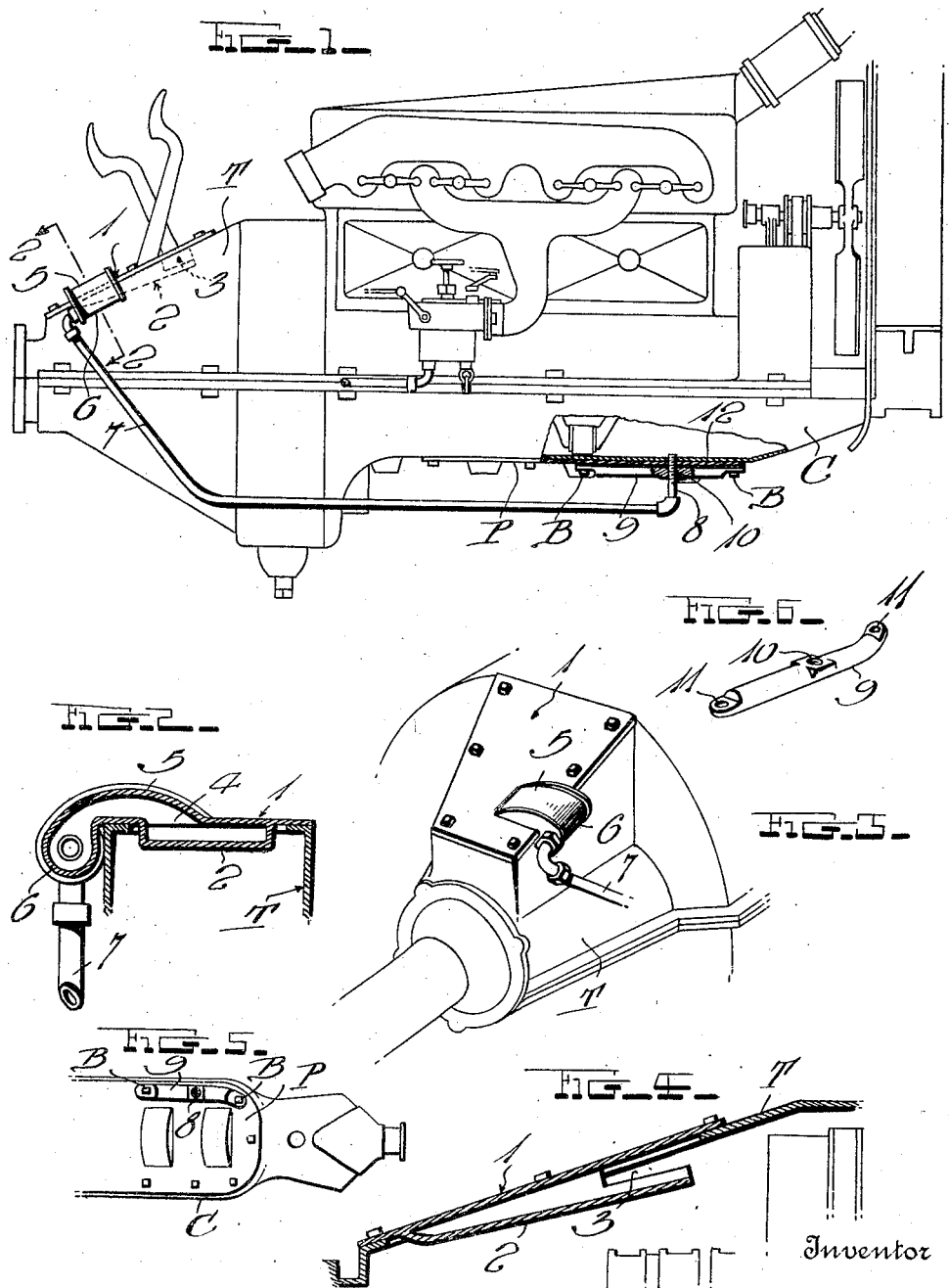

1,446,516

UNITED STATES PATENT OFFICE.

JOHN ORTWEIN, OF SHELBURN, OREGON.

LUBRICATING DEVICE FOR AUTOMOBILES.

Application filed December 7, 1921. Serial No. 520,636.

*To all whom it may concern:*

Be it known that I, JOHN ORTWEIN, a citizen of the United States, residing at Shelburn, in the county of Linn and State of Oregon, have invented certain new and useful Improvements in Lubricating Devices for Automobiles; and I do declare the following to be a full, clear, and exact description of the invention, such as will enable others skilled in the art to which it appertains to make and use the same.

This invention relates to an improved device in the form of an attachment, which is designed for insuring continuous lubrication of the parts of the engine which are neglected when the automobile is on an incline, especially when climbing a comparatively steep grade.

It is the principal object of the invention to associate the device with a removable transmission cover so that when the engine is in operation, a quantity of oil will be splashed into a pocket and collected in a receiving cylinder so that when the machine is climbing a hill, oil will be supplied to the front crank shaft bearing and timing gears through a conduit leading from the rather highly elevated cylinder to these elements.

Another object of the invention is to generally improve upon devices of this class by providing one of extreme simplicity and durability which is practical, and is such in construction that it can be installed by unskilled hands.

Another and very important object of the invention is to provide an attachment of this class wherein the aforesaid conduit is in the form of a small piping terminating with a short vertically disposed piece which is adapted to extend loosely through the alined existing bolt holes in the oil pan and crank case. Hence, when installing the device it is entirely unnecessary to drill any holes whatsoever in order to apply the lubricant to the desired point.

A further object of the invention is to provide an attachment embodying the aforesaid construction together with a novel connecting bar or member having a hole through which said short piece of pipe extends, this bar being connected with the oil pan by the existing bolts which serve to connect the latter with the inwardly directed flange on the bottom of the crank case.

Other objects and advantages of the invention will be apparent during the course of the following description.

In the accompanying drawings forming a part of this specification and in which like numerals are employed to designate like parts throughout the same:

Figure 1 is an elevational view of a conventional type of automobile engine, with parts of the crank case and oil pan shown in section, showing my improved lubricating attachment associated therewith.

Figure 2 is an enlarged detail section taken substantially on the plane of the line 2—2 of Fig. 1.

Figure 3 is an enlarged detail perspective view of the improved transmission cover plate.

Figure 4 is a central longitudinal sectional view through the plate.

Figure 5 is a bottom plan view of the oil pan and crank case showing the manner of connecting the bar with these parts.

Figure 6 is a detail perspective view of the connecting bar.

In the drawings, the letter C designates an automobile engine crank case, P designates the removable oil pan and T the removable section of the transmission housing which is formed with an opening closed by a removable cover plate to enable access to be had to the bands and other adjacent parts.

The invention, as before indicated, resides in the employment of a new form of cover plate 1 which is shaped like the one now in use and is secured in place by the existing bolts. The improved cover plate however is equipped with a rearwardly tapered pocket 2 which is open at its forward end to permit oil contained in the crank case to be splashed into this pocket by the flywheel which is located just in front of it. To enable the oil to be more effectively thrown into the pocket, the right-hand side of this part is provided with a notch 3. As the oil collects in the pocket, it flows rearwardly and discharges through an opening 4 formed in the cover plate and passes through this opening and through a comparatively wide curved conduit 5 which communicates with a receiving cylinder 6. This cylinder is disposed adjacent the right hand edge of the cover plate and is positioned on a plane below the plate. A considerable quantity of oil is collected in this receiving cylinder and is conveyed back to the crank case through the small pipe 7 which is connected with one end thereof and discharges into the crank case. A continuous circulation of the oil is thus kept up even when the machine is going up a grade. Consequently, the front crank shaft bearing and timing gears are thus continuously lubricated instead of being neglected as they are now with the present system.

It has been hereinbefore indicated that particular emphasis is to be laid on the manner of connecting the short upwardly directed piece of pipe 8 with the oil pan P and although the means could be of some other construction, I preferably employ a bar 9 having at its center a hole 10 for passage of the pipe 8 and provided at its opposite ends with holes 11 for passage of the bolts B. This bar is of a length to permit the existing bolts which serve to connect the oil pan with the crank case to be used for connecting the bar to the oil pan. In practice, an elongated gasket 12 will be arranged between the bar and oil pan to prevent leakage and the aforesaid hole 10 in the center of the bar will be screw-threaded to permit the short pipe 8 to be tapped therein. It may be that the bolt holes now under consideration may vary somewhat in size on different machines and in order to overcome the necessity of employing special pieces of pipes of a size and threaded to accurately fit the holes, the specific connecting means described is preferably employed.

In installing the device, the existing transmission cover plate is removed and the improved plate substituted therefor, the oil retaining cylinder being located on the right-hand side of the machine. The forward three bolts B which assist in connecting the oil pan P with the crank case are removed and the connecting bar 9 bolted in place so that the central threaded hole 10 registers with the adjacent bolt holes in the pan and crank case. Assuming that the pipe 7 has been connected with the cylinder, the short upwardly directed piece 8 is passed through the hole 10 and bolt holes so as to project into the crank case. Hence, when the machine is in operation, the oil contained in the bottom of the crank case adjacent the fly wheel will be carried upwardly by the latter and thrown in the open end of the aforesaid pocket. From the latter, it will flow through the discharge opening 4, conduit 5 and will be collected in the receiving cylinder 6. From the latter, it will pass through the pipes 7 and 8 and back to the crank case to insure an effective circulation and proper lubrication of all parts of the engine, especially the forward bearings and timing gears when the machine is climbing a hill. The piping 7 is detachably connected with the aforesaid receiving cylinder and it is therefore very easy to disconnect the pipe to enable the cover plate to be removed so that access can be had to the transmission bands, drums and other elements.

By carefully considering the description in connection with the drawings, persons familiar with devices of this class will doubtless be able to obtain a clear understanding of the invention. Therefore, a more lengthy and detailed description of the invention is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

A transmission cover plate provided on its underface with an integral rearwardly tapered oil collecting pocket, the latter being open at its forward end and having a slot formed in one vertical side and opening through the free end of said side to facilitate collecting of oil from a rotating fly-wheel, said plate also being provided at the closed rear end of said pocket with a discharge opening, a substantially cylindrical receiving pocket alongside one edge of the plate on a plane below the underface of the latter, and a transverse conduit leading from the aforesaid discharge opening to the receiving pocket, both of said pockets, plate and conduit being all one integral structure, and the conduit being the same in width as the length of the receiving pocket.

In testimony whereof I have hereunto set my hand.

JOHN ORTWEIN.